(No Model.)
J. HARPER.
DRAIN PLOW.
No. 361,696. Patented Apr. 26, 1887.
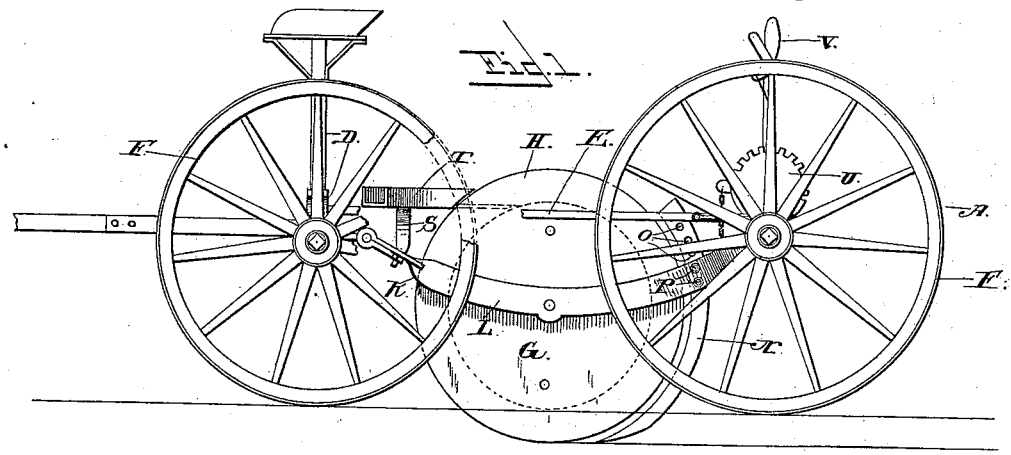
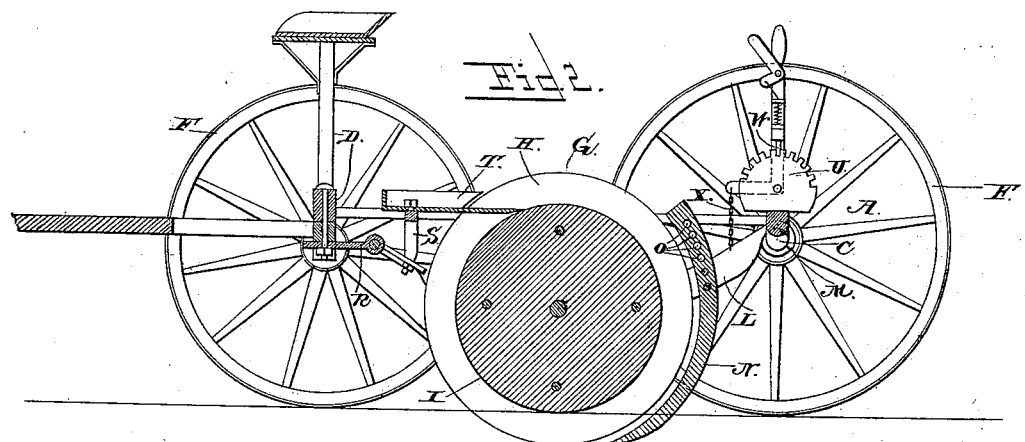
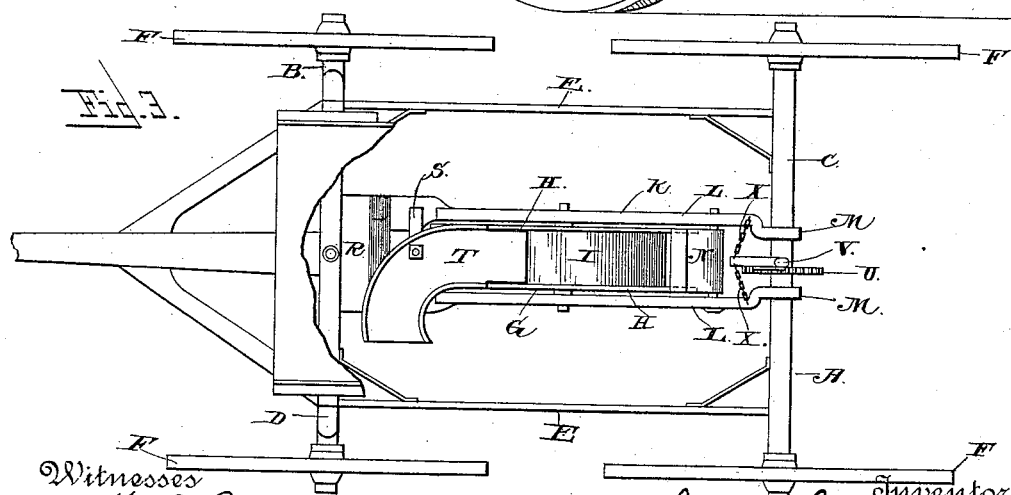
Witnesses
M. Fowler
E. G. Siggers
Inventor
James Harper
By his Attorneys
C. A. Snowles

UNITED STATES PATENT OFFICE.

JAMES HARPER, OF CHAMOIS, MISSOURI.

DRAIN-PLOW.

SPECIFICATION forming part of Letters Patent No. 361,696, dated April 26, 1887.

Application filed October 22, 1886. Serial No. 216,972. (No model.)

*To all whom it may concern:*

Be it known that I, JAMES HARPER, a subject of the Queen of Great Britain, residing at Chamois, in the county of Osage and State of Missouri, have invented a new and useful Improvement in Drain-Plows, of which the following is a specification.

My invention relates to an improvement in plows for cutting drain-ditches; and it consists in the peculiar construction and combination of devices, that will be more fully set forth hereinafter, and particularly pointed out in the claims.

In the drawings, Figure 1 is a side elevation of a drain-plow embodying my improvements. Fig. 2 is a longitudinal sectional view of the same. Fig. 3 is a top plan view.

A represents the running-gear of a wagon, having the front axle, B, the rear axle, C, the tongue attached to the front axle, the bolster D, and the reaches E, connecting the said bolster with the rear axle, the said reaches being arranged at a suitable distance apart. The usual supporting-wheels, F, are mounted on the spindles of the axles.

G represents a rotating cutter, comprising two circular disks, H, and a circular block, I, which is of less diameter than the disks, and is bolted between the same and arranged concentrically therewith. The periphery of the block I forms the thread of the rotating cutter, and the space between the projecting edges of the cutting-disks H and the tread forms an annular peripheral groove in the cutter. The edges of the disks H are sharpened, and the block I is of a width to correspond with the width of the drain-ditch to be formed.

K represents a longitudinal frame having the side bars, L, between which the cutter is journaled. The rear ends of the side bars are provided with hooks M.

N represents a plow, which is secured between the side bars and bears against the rear side of the rotating cutter, the width of the said plow being equal to the width of the cutter, and the said plow being curved and adapted to the contour of the rear side of the cutter. The lower end of the plow is on a horizontal line with the lower edges of the cutting-disks H, and is sharpened. A series of transverse openings, O, are made in the upper portion of the plow, and bolts P extend through two of the said openings and through openings which are made in the side bars, and thus secure the plow to the side bars and permit the same to be vertically adjusted. To the front ends of the side bars is hinged a plate, R, having a central opening, through which extends the king-bolt of the wagon, and thus the rotating cutter with its frame is trailed behind the front axle of the wagon. A vertical yoke-frame, S, extends from the upper sides of the side bars, L, in advance of the rotating cutter and supports the horizontal curved chute T. The rear end of the said chute forms a tongue which enters the space between the upper edges of the cutting-disks and bears upon the upper side of the circular block I on the periphery thereof and acts as a scraper.

U represents a segmental plate, which is provided with peripheral notches, and is secured on the rear axle of the running-gear. A hand-lever, V, is pivoted to the said segment-plate, and is provided with a spring-actuated bolt, W, to engage the notches of the segment-plate, and thus lock the hand-lever at any desired angle. A chain, X, engages the hooks M on the rear end of the cutter-frame, and is attached to the lever V, whereby the rear end of the frame K may be raised or lowered by the said lever.

A suitable seat for the driver is supported above the front axle.

The operation of my invention is as follows: In order to cut a drain-ditch, the frame K is lowered from the wagon-gear, so as to cause the lower edges of the rotating cutter and of the plow to enter the ground. The wagon is then drawn forward by the team, and the cutter is caused to rotate, and the edges of the disks H thereof cut the sides of the ditch. The plow, running in rear of the rotating cutter, cuts the bottom of the ditch and forces the earth upwardly between its front side and the rear side of the rotating cutter and directs it onto the curved chute, the front end of which projects beyond one side of the ditch, and thereby the earth which is excavated is deposited by the chute on one side of the ditch. In order to turn the wagon, it is necessary to raise the rear end of the frame K a sufficient height to cause the rotating cutter and the plow to clear the ground, and this is also done when the machine is in motion but not in operation.

Having thus described my invention, I claim—

1. In a drain-plow, the combination of the frame K, the plate R, hinged to its front end and provided with an opening for the reception of the king-bolt of a wagon-gear, whereby the frame may be trailed from the front axle, the rotating cutter journaled in the frame, the plow in rear of the cutter, and the chute supported upon the front end of the frame and having its rear end bearing upon the upper side of the rotating cutter, for the purpose set forth, substantially as described.

2. The combination, with the running-gear of a wagon, of the frame K, pivotally connected to the front axle and trailing from the same, the rotating circular cutter journaled in the frame K, the plow in rear of the cutter, the curved chute having its rear end bearing against the front upper side of the cutter, and the lever V, fulcrumed to the rear axle of the wagon and connected to the rear end of the frame K, for the purpose set forth, substantially as described.

3. In a drain-plow, the combination of a frame, K, a plate, R, hinged to the front end of the frame and adapted to be connected with the front axle of a wagon-gear, to thereby trail the frame from the front axle, a rotating cutter journaled in the frame, the plow carried by the frame in rear of the cutter, a chute resting at the rear end on the cutter, and a bolt, S, connecting the chute to the plate R, to thereby support the front end of the chute and prevent displacement of the same, as and for the purpose described.

In testimony that I claim the foregoing as my own I have hereto affixed my signature in presence of two witnesses.

JAMES HARPER.

Witnesses:
WM. N. MOORE,
E. G. SIGGERS.